United States Patent [19]

Chek

[11] Patent Number: 4,866,430
[45] Date of Patent: Sep. 12, 1989

[54] LOW VOLTAGE LED DRIVER CIRCUIT
[75] Inventor: Boh K. Chek, Singapore, Singapore
[73] Assignee: Motorola, Inc., Schaumburg, Ill.
[21] Appl. No.: 253,339
[22] Filed: Oct. 3, 1988

Related U.S. Application Data

[63] Continuation of Ser. No. 940,679, Dec. 11, 1986, abandoned.
[51] Int. Cl.$^4$ .............................................. G09G 3/32
[52] U.S. Cl. ................................. 340/782; 340/762; 340/811; 315/307
[58] Field of Search ............... 340/762, 782, 811, 812, 340/813; 315/307; 455/343; 368/203, 204

[56] References Cited

U.S. PATENT DOCUMENTS

| Re. 32,365 | 3/1987 | Sebestyen | 340/792 |
|---|---|---|---|
| 3,740,570 | 6/1973 | Kaelin et al. | 340/782 |
| 3,813,664 | 5/1974 | Geyer | 340/815.03 |
| 3,828,547 | 8/1974 | Fujita | 340/811 |
| 4,060,752 | 11/1977 | Walker | 315/307 |
| 4,190,836 | 2/1986 | Kimura et al. | 340/762 |
| 4,633,141 | 12/1986 | Weber | 340/781 |

Primary Examiner—David K. Moore
Assistant Examiner—Jeffery A. Brier
Attorney, Agent, or Firm—Philip P. Macnak; Vincent B. Ingrassia

[57] ABSTRACT

A low voltage LED driver circuit utilizes a small magnitude inductor in combination with an astable multivibrator to supply sufficient operating voltage to illuminate an LED from a supply voltage source less than the LED's typical operating voltage. By use of the high pulse rate of multivibrator in conjunction with the small magnitude inductor, the LED is turned on and off at a rate at which it appears to be continuously illuminated to the human eye.

11 Claims, 1 Drawing Sheet

LOW VOLTAGE LED DRIVER CIRCUIT

BACKGROUND OF THE INVENTION

This is a continuation of application Ser. No. 940,679 filed Dec. 11, 1986, now abandoned.

The present invention relates, in general, to a light emitting diode (LED) driver circuit. More particularly, the present invention relates to a low voltage LED driver circuit of special utility for use in conjunction with portable electronic equipment, such as pagers, having but a single low voltage battery power source.

Conventional, miniaturized portable electronics devices such as pagers which may have a package volume on the order of 40 cm$^3$ will generally have a single cell 1.0–1.5 volt battery power source. In the prior art, providing a visual signal indicator has necessitated the use of miniature filament lamps instead of an LED which generally requires about 2 volts for operation. However, the use of filament lamps results in a rather large current drain as they will generally draw about 30 milliamps as opposed to an LED's 10 milliamp current drain. Moreover, filament lamps are inherently more susceptible to filament vibration or impact failures, particularly after a period of use.

Previous approaches to circumventing the use of filament lamps utilized driving LED's from a low voltage DC converter power source, but this presents undesirable aspects, particularly with respect to cost and packaging volumes. The prior art method of operating an LED makes use of a DC to DC converter and requires a square wave generator to generate a pulse train which drives the DC to DC converter to obtain the required operating voltage to drive the LED. The normal voltage waveform for such a circuit would be a DC level with a ripple voltage at the frequency of the square wave input resulting from the charging and discharging of the various circuit elements. However, due to the loading effect of the LED, which would be seen by the DC-DC converter as a very low impedance, a very large inductor is required in order to provide sufficient energy to drive the LED.

SUMMARY OF THE INVENTION

It is therefore an object of the present invention to provide an improved low voltage LED driver circuit.

It is further an object of the present invention to provide an improved low voltage LED driver circuit which is readily and economically implemented requiring a minimum of inexpensive circuit elements.

It is further an object of the present invention to provide an improved low voltage LED driver circuit which provides for operation of an LED at voltages exceeding that of the supply voltage level using only a small value inductor.

It is still further an object of the present invention to provide an improved low voltage LED driver circuit which allows for the use of an LED indicator in lieu of filament lamps in low voltage applications thereby providing for low current consumption and more reliable operation.

The foregoing and other objects are achieved in the present invention wherein there is provided a display device which comprises a light emitting diode (LED) which is connected to driving means including an astable multivibrator circuit. A low value inductor is coupled to both the driving means and the LED. Also included are enabling means for the driving means to cause illumination of the LED.

The astable multivibrator circuit further comprises a first and second switching devices, each having respective control, first and second current carrying electrodes. The first current carrying electrode of the first switching device is coupled to a supply voltage line. The second current carrying electrodes of each of the first and second switching devices are coupled to a common voltage or ground potential line. The control electrodes of each of the first and second switching device are capacitively coupled to the first current carrying electrodes of the second and first switching devices respectively. The first current carrying electrode of the second switching device defines an output node. An inductor couples the supply voltage line to the output node and an LED couples the output node to the common voltage line.

In a more particular embodiment of the present invention, the means for enabling includes a third switching device which has control, first and second current carrying electrodes. The first current carrying electrode is coupled to the inductor and the second current carrying electrode is coupled to the source voltage line. As a result, the inductor is in series connection with the third switching device between the supply voltage line and the output node where the control electrode of the third switching device defines a control input. Thus, when a suitable voltage is applied to the control elecstrode of the third switching device, the low voltage LED driver circuit is activated to cause the LED to illuminate.

BRIEF DESCRIPTION OF THE DRAWINGS

The abovementioned and other features and objects of the present invention and the manner of attaining them will become more apparent and the invention itself will be best understood by reference to the following description of an embodiment of the invention taken in conjunction with the accompanying drawings, wherein.

DESCRIPTION OF A PREFERRED EMBODIMENT

Figure 1:
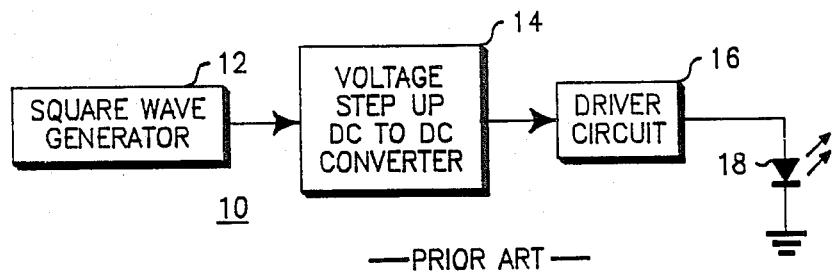
FIG. 1 is a functional block diagram of a conventional or prior art DC to DC converter suitable for driving an LED from a low battery voltage source.

With reference to FIG. 1, a conventional or prior art LED driving system 10 is shown. Conventional LED driving system 10 comprises square wave generator 12 for producing a pulse train input to DC to DC converter 14. DC to DC converter 14 is well known in the art and normally would comprise a voltage step-up circuit which may be as little as a one transistor device utilized to obtain the required voltage to drive LED 18 by means of driver circuit 16. Driver circuit 16 may be represented simply as a switch which is actuated to couple the converter output when the LED is to be illuminated. In addition to the inductor, converter 14 would normally have a diode for half wave rectification, a storage capacitor, and a current limiting resistor. The DC to DC converter is driven at the square wave input frequency and the normal output is a unregulated DC level with a ripple voltage at the frequency of the input square wave. An inherent limitation of conventional LED driving system 10 is that the high loading effect of LED 18 in combination with the input square wave frequency requires a relatively large value inductor in order to provide sufficient energy to drive the LED.

Figure 2:
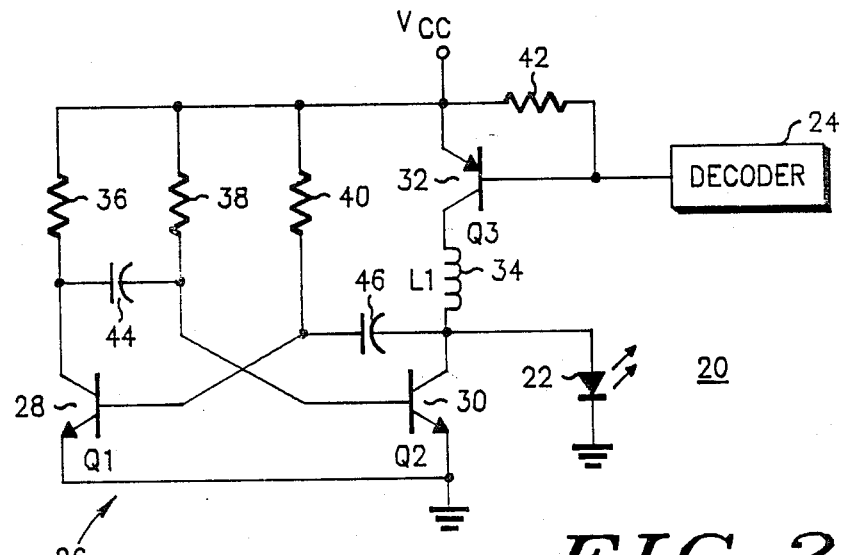
FIG. 2 is an electrical schematic of an LED driver circuit in accordance with the present invention showing the use of a series connected control transistor and inductor combined with an astable multivibrator.

Referring now to FIG. 2, an electrical schematic diagram for an LED driver circuit 20 in accordance with the present invention is shown. LED driver circuit 20 makes use of a modified astable multivibrator 26 which is gated by means of decoder circuit 24 for providing the driving energy for LED 22. As shown, control transistor 32 acts to enable and disable astable multivibrator 26 of LED driver circuit 20 in accordance with the control waveform output of decoder circuit 2, shown in FIG. 3A. Astable multivibrator 26 will be shown to be supplied with a square wave input, but this is a control wave form which does not affect the output frequency of multivibrator 26. As will be described in more detail later, it is only when control transistor 32 is turned on that astable multivibrator 26 is actuated so that LED 22 may be illuminated.

Astable multivibrator 26 comprises cross-coupled NPN transistors 28 and 30 (Q1, Q2). Transistors 28 and 30 have their emitter electrodes coupled to a common voltage line (or circuit ground) and each of their respective base electrodes is capacitively coupled to the collector terminal of the other. In this regard, capacitor 44 couples the base electrode of transistor 30 to the collector electrode of transistor 28. In like manner, capacitor 46 couples the base electrode of transistor 28 to the collector of transistor 30. The collector electrode of transistor 30 defines an output node and the collector electrode of transistor 28 is coupled to a supply voltage line (VCC) by means of resistor 36. The base electrodes of transistors 28 and 30 are additionally coupled to the supply voltage line by means of resistor 40 and 38 respectively.

Figure 3A:
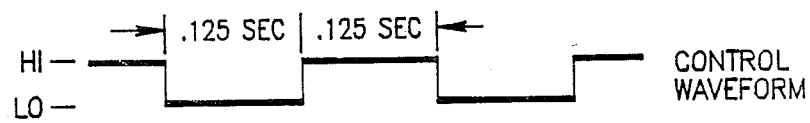
FIG. 3A illustrates the driving signal to the base of the control transistor for activation of the low voltage LED driver circuit.

PNP control transistor 32 (Q3) has its emitter electrode connected to the supply voltage line and its collector electrode coupled to one terminal of inductor 34 (L1). The other terminal of inductor 34 is connected to the output node at the collector of transistor 30. Control transistor 32 has its base electrode coupled to its emitter electrode by means of resistor 42. The base of control transistor 32 defines an input for the control waveform output of decoder circuit 24 as shown in FIG. 3A. LED 22 couples the output node at the collector of transistor 30 to a common voltage line (or ground).

Figure 3B:
FIG. 3B illustrates the collector waveform at the output node for driving the LED using the electrical schematic shown in FIG. 2.

In operation, transistors 28, 30; capacitors 44, 46; and resistors 36, 38, and 40 form the prime components of astable multivibrator 26. As shown in FIG. 3A, the period of a typical input square wave is 0.250 sec. When control transistor 32 is turned during the low voltage portions of the wave form as shown in FIG. 3A, astable multivibrator 26 is actuated. The output of astable multivibrator 26 is a square pulse train at the output node at the collector of transistor 30 during corresponding time intervals. Due to the presence of inductor 34 which couples the collector of transistor 30 to the supply voltage line, the voltage at the collector of transistor 30 is stepped up as is shown in FIG. 3B. In contrast to the prior art circuits, the frequency of the stepped up output pulse train is now independent of the frequency of the square wave input waveform. Thus, when actuated by the control waveform, LED driver circuit 20 supplies sufficient energy to turn on LED 22 during the pulse train intervals which are now dependent only upon the operational frequency of multivibrator circuit 26.

Assuming transistor 28 to be on and transistor 30 to be off, capacitor 44 will charge via transistor 28 and resistor 38 until the voltage of the base of transistor 30 becomes sufficiently positive to turn on transistor 30. There is established a first time constant which is a function of the magnitudes of resistor 38 and capacitor 44. While capacitor 44 is charging, one end of capacitor 46 is held near 0.6 volts by the base of transistor 28, while the other end is at the output node at the collector of transistor 30, which was at nearly VCC since transistor 30 was off. This causes capacitor 46 to charge relative to the base of transistor 28. When transistor 30 turns on, its collector changes potential from approximately VCC to a small saturation voltage. This results in a negative voltage due to capacitor 46 having been charged being applied to the base of transistor 28 causing it to switch off immediately.

Since transistor 28 is now off, capacitor 44 charges in the opposite polarity through resistor 36 and the base-emitter junction of transistor 30. Capacitor 46 charges through resistor 40 and transistor 30, and this establishes a second time constant which is a function of the magnitudes of resistor 40 and capacitor 46. The combination of first and second time constants controls the pulse train frequency and duty cycle of the square wave pulse train as shown in FIG. 3B.

As will be described later, a typical pulse train frequency may be in the range of 300 KHz to 500 KHz. When capacitor 46 has charged sufficiently, the cycle will repeat, and transistor 28 will again be brought into conduction and capacitor C46 will charge in an opposite polarity through inductor L1 and the base of transistor 28.

In a particular embodiment of LED driver circuit 20 and as an example only, the following approximate component values may be used: Resistor 36 equals 5.6K ohms; resistor 38 equals 82K ohms; resistor 40 equals 30K ohms; capacitor 44 equals 20 pf; capacitor 46 equals 220 pf; and inductor 34 equals 390 microhenries or less. By use of the component values previously specified, astable multivibrator 26 will operate at a frequency of approximately 500 KHz. Thus, LED driver circuit 20 by means of the output of astable multivibrator 26 will pulse LED 22 at a high rate by means of a pulse train waveform the voltage level of which exceeds the supply voltage level VCC. By use of the fast rate pulse train created by LED driver circuit 20, the rate of turning on and turning off of LED 22 will be observed by the human eye as being on continuously due to the persistence of vision. It should be noted that the rate of the pulse train can, of course, be varied by changing the value of capacitors 44 and 46 and utilizing a different value for resistor 38 and inductor 34. This will have the effect of varying the energy transfer by LED driver circuit 20 and thus affecting the brightness of LED 22.

What has been provided, therefore, is an improved low voltage LED driver circuit which is readily and economically implemented requiring a minimum of inexpensive circuit elements. The low voltage LED driver circuit of the present invention provides for operation of an LED at voltages exceeding that of the supply voltage level with only a small inductor. The LED driver circuit of the present invention also allows for the use of LED indicators in lieu of filament lamps in low voltage applications, thereby providing for low current consumption and more reliable operation.

While there have been described above the principles of the invention in conjunction with specific apparatus, it is to be clearly understood that this description is made only by way of example and not as a limitation to the scope of the invention.

What is claimed is:

1. A display device comprising:
    a light emitting diode;
    single cell battery means having a ground terminal coupled to a common voltage line and a positive terminal coupled to a supply voltage line;
    driving means including an astable multivibrator circuit comprising first and second switching devices having respective control, first and second current carrying electrodes, said first current carrying electrode of said first switching device being coupled to said supply voltage line, each of said second current carrying electrodes of said first and second switching devices being coupled to said common voltage line, said control electrodes of each of said first and second switching devices being capacitively coupled to said first current carrying electrodes of said second and first switching devices respectively, said first current carrying electrode of said second switching device defining an output node coupled to said LED;
    means for enabling said driving means, said means including a third switching device having control, first and second current carrying electrodes, said second current carrying electrode being coupled to said supply voltage line, said control electrode of said third switching device defining a control input; and
    an inductor, having first and second terminals, said first terminal coupled to said output node and said second terminal coupled to said first current carrying electrode of said third switching device, wherein enabling said driving means effects said inductor generating an output voltage suitable for said driving means to illuminate said LED.

2. The display device of claim 1 wherein said means for enabling further comprises a source of square wave input voltage applied to said control input.

3. The display device of claim 2 wherein said source of square wave input voltage is a pager decoder circuit.

4. The display device of claim 2 further comprising a resistor coupling said control and second current carrying electrodes of said third switching device.

5. The display device of claim 2 wherein said first current carrying electrode of said first switching device and said control electrode of said first and second switching devices are resistively coupled to said supply voltage line.

6. The display device of claim 1 wherein said inductor has a value of substantially 390 microhenries.

7. The display device of claim 2 wherein said single cell battery means provides an output of substantially 1.3 volt magnitude.

8. The display device of claim 2 wherein said first and second switching devices are bipolar transistors.

9. The display device driver of claim 8 wherein said bipolar transistors are NPN devices.

10. The display device of claim 2 wherein said third switching device is a bipolar transistor.

11. The display device of claim 10 wherein said bipolar transistor is a PNP device.

* * * * *